United States Patent
Takagi

(10) Patent No.: US 9,560,476 B2
(45) Date of Patent: Jan. 31, 2017

(54) WIRELESS COMMUNICATION APPARATUS CAPABLE OF COMMUNICATING WITH EXTERNAL APPARATUS, CONTROLLING METHOD FOR WIRELESS COMMUNICATION APPARATUS, AND STORAGE MEDIUM

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/850,360

(22) Filed: Sep. 10, 2015

(65) Prior Publication Data

US 2016/0088423 A1    Mar. 24, 2016

(30) Foreign Application Priority Data

Sep. 18, 2014   (JP) ................. 2014-190088

(51) Int. Cl.
*H04W 4/00* (2009.01)
*H04W 84/12* (2009.01)
*H04W 8/00* (2009.01)

(52) U.S. Cl.
CPC ............. *H04W 4/008* (2013.01); *H04W 8/005* (2013.01); *H04W 84/12* (2013.01)

(58) Field of Classification Search
CPC .................................................... H04W 4/008
See application file for complete search history.

(56) References Cited

U.S. PATENT DOCUMENTS

| | | | | |
|---|---|---|---|---|
| 2009/0111378 A1* | 4/2009 | Sheynman | ............ | H04W 8/005 455/41.1 |
| 2009/0221271 A1* | 9/2009 | Soma | .................. | H04M 1/7253 455/414.1 |

FOREIGN PATENT DOCUMENTS

JP           2014-131108 A       7/2014

* cited by examiner

*Primary Examiner* — Tuan H Nguyen
(74) *Attorney, Agent, or Firm* — Canon USA, Inc., IP Division

(57) ABSTRACT

A wireless communication apparatus includes, a first communication unit that performs communication with an external apparatus through a first wireless communication method, a second communication unit that performs communication with the external apparatus through a second wireless communication method, and a control unit that establishes the communication with the external apparatus through the second communication unit using a communication parameter shared with the external apparatus through the first communication unit. The control unit determines, in response to activation of the wireless communication apparatus, whether the wireless communication apparatus is in a predetermined state and sets the wireless communication apparatus to be in a state of either executing or not executing communication processing based on whether the wireless communication apparatus is in the predetermined state.

16 Claims, 7 Drawing Sheets

FIG. 5

| | | CONDITION FOR WIRELESS LAN CONNECTION UNAVAILABLE STATE | CONDITION FOR WIRELESS LAN CONNECTION AVAILABLE STATE |
|---|---|---|---|
| CONDITION 1 | POWER STATE | OFF | ON |
| CONDITION 2 | WIRELESS LAN FUNCTION | WIRELESS LAN FUNCTION IS INVALIDATED | WIRELESS LAN FUNCTION IS VALIDATED |
| CONDITION 3 | WIRELESS LAN COMMUNICATION | WIRELESS LAN COMMUNICATION IS PERFORMED | WIRELESS LAN COMMUNICATION IS NOT PERFORMED |
| CONDITION 4 | MEMORY CARD | MEMORY CARD IS NOT INSERTED | MEMORY CARD IS INSERTED |
| CONDITION 5 | IMAGE CAPTURING STATE | CAPTURING OF STILL IMAGE IN PROCESS | CAPTURING OF STILL IMAGE NOT IN PROCESS |
| CONDITION 6 | MOVING IMAGE CAPTURING STATE | CAPTURING OF MOVING IMAGE IN PROCESS | CAPTURING OF MOVING IMAGE NOT IN PROCESS |

WIRELESS COMMUNICATION APPARATUS CAPABLE OF COMMUNICATING WITH EXTERNAL APPARATUS, CONTROLLING METHOD FOR WIRELESS COMMUNICATION APPARATUS, AND STORAGE MEDIUM

BACKGROUND

Field

Aspects of the present invention generally relate to a wireless communication apparatus that communicates with an external apparatus.

Description of the Related Art

In recent years, different communication methods have been used for wireless communication between a digital camera and a mobile phone, depending on a communication distance. Thus, a technique of switching communication methods depending on a communication distance for transmitting and receiving data has also been known. In particular, a technique of performing authentication through close proximity wireless communication such as Near Field Communication (NFC) and causing wireless LAN communication to take over the communication has been attracting attention. Furthermore, there is a technique of remotely controlling a digital camera from a mobile phone by performing the wireless LAN communication between the digital camera and the mobile phone.

For example, Japanese Patent Application Laid-Open No. 2014-131108 discusses a system in which a service set identifier (SSID) and a password are shared between a camera and a mobile phone by using a tag memory of the NFC, so that a wireless LAN connection is established between the camera and the mobile phone without requiring a user operation.

However, since data can be freely written to the NFC tag memory from an external device, abnormal information may be written to the tag memory in a close proximity wireless communication unit of the digital camera or important information that has already been written thereto may be erased, via the mobile phone. In this case, when trying to perform the close proximity wireless communication with the digital camera next time, the mobile phone cannot read out information from the digital camera.

SUMMARY

A wireless communication apparatus includes, a first communication unit configured to perform communication with an external apparatus through a first wireless communication method, a second communication unit configured to perform communication with the external apparatus through a second wireless communication method different from the first wireless communication method, and a control unit configured to control communication processing of establishing the communication with the external apparatus through the second communication unit by using a communication parameter shared with the external apparatus through the first communication unit. The control unit determines, in response to activation of the wireless communication apparatus, whether the wireless communication apparatus is in a predetermined state. When it is determined that the wireless communication apparatus is in the predetermined state, the control unit sets the wireless communication apparatus to be in a state of executing the communication processing. When it is determined that the wireless communication apparatus is not in the predetermined state, the control unit sets the wireless communication apparatus to be in a state of not executing the communication processing. The control unit sets, before the determination is made, the wireless communication apparatus to be in the state of not executing the communication processing in response to activation of the wireless Further features of the present disclosure will become apparent from the following description of exemplary embodiments with reference to the attached drawings.

BRIEF DESCRIPTION OF THE DRAWINGS

FIG. 5 illustrates an example of a condition table.

DESCRIPTION OF THE EMBODIMENTS

Exemplary embodiments will be described below with reference to the drawings.

<Network System Configuration>

Figure 1:
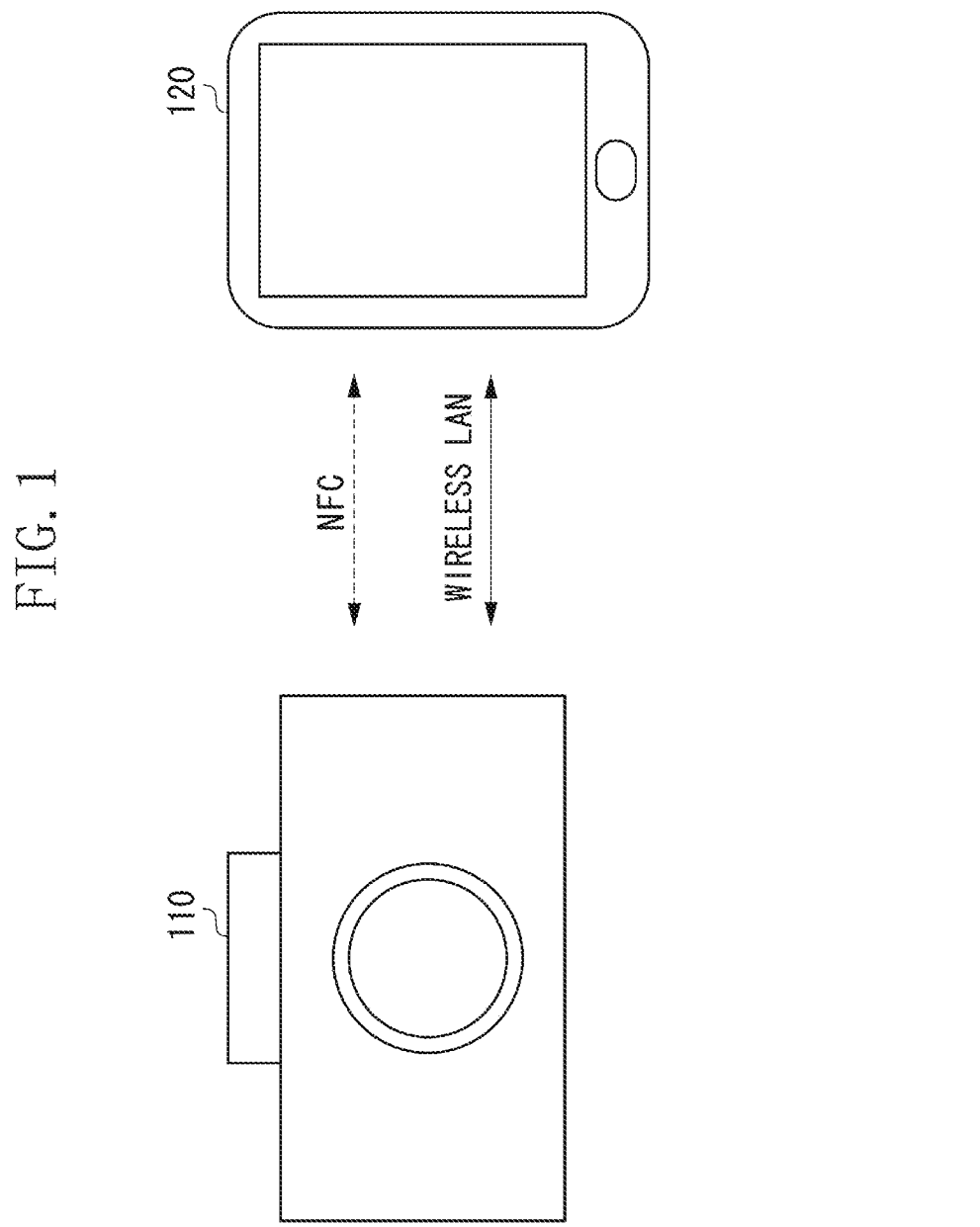
FIG. 1 is a diagram illustrating a communication system 100 according to a first exemplary embodiment.

FIG. 1 is a diagram illustrating a communication system 100 according to a first exemplary embodiment. The communication system 100 includes a digital camera 110 and a mobile phone 120 as wireless communication apparatuses that perform wireless communication. Each wireless communication apparatus that performs the wireless communication may be an information processing apparatus such as a portable media player, a tablet device, or a personal computer.

As illustrated in FIG. 1, the digital camera 110 and the mobile phone 120 can communicate with each other through close proximity wireless communication based on an NFC method. The digital camera 110 and the mobile phone 120 may also communicate with each other through wireless communication using a wireless LAN method. In the NFC method, the mobile phone 120 having a reader/writer function performs communication by reading out information stored in a tag memory 213 of the digital camera 110. In the wireless LAN method, the digital camera 110 has an access point function, and the communication is performed by the mobile phone 120, in an infrastructure mode, connecting to a wireless LAN network established by the digital camera 110. Both the wireless LAN method and the NFC method are examples of wireless communication methods. The NFC method is a wireless communication method having a short communication distance compared to the wireless LAN method.

The wireless communication between the digital camera 110 and the mobile phone 120 in the close proximity wireless communication may be taken over by the wireless LAN communication, when the mobile phone 120 reads out information required for the wireless LAN connection from the tag memory 213 through the close proximity wireless communication. In the description below, processing in which communication is taken over is hereinafter referred to as handover.

<Configuration of Digital Camera>

Figure 2:
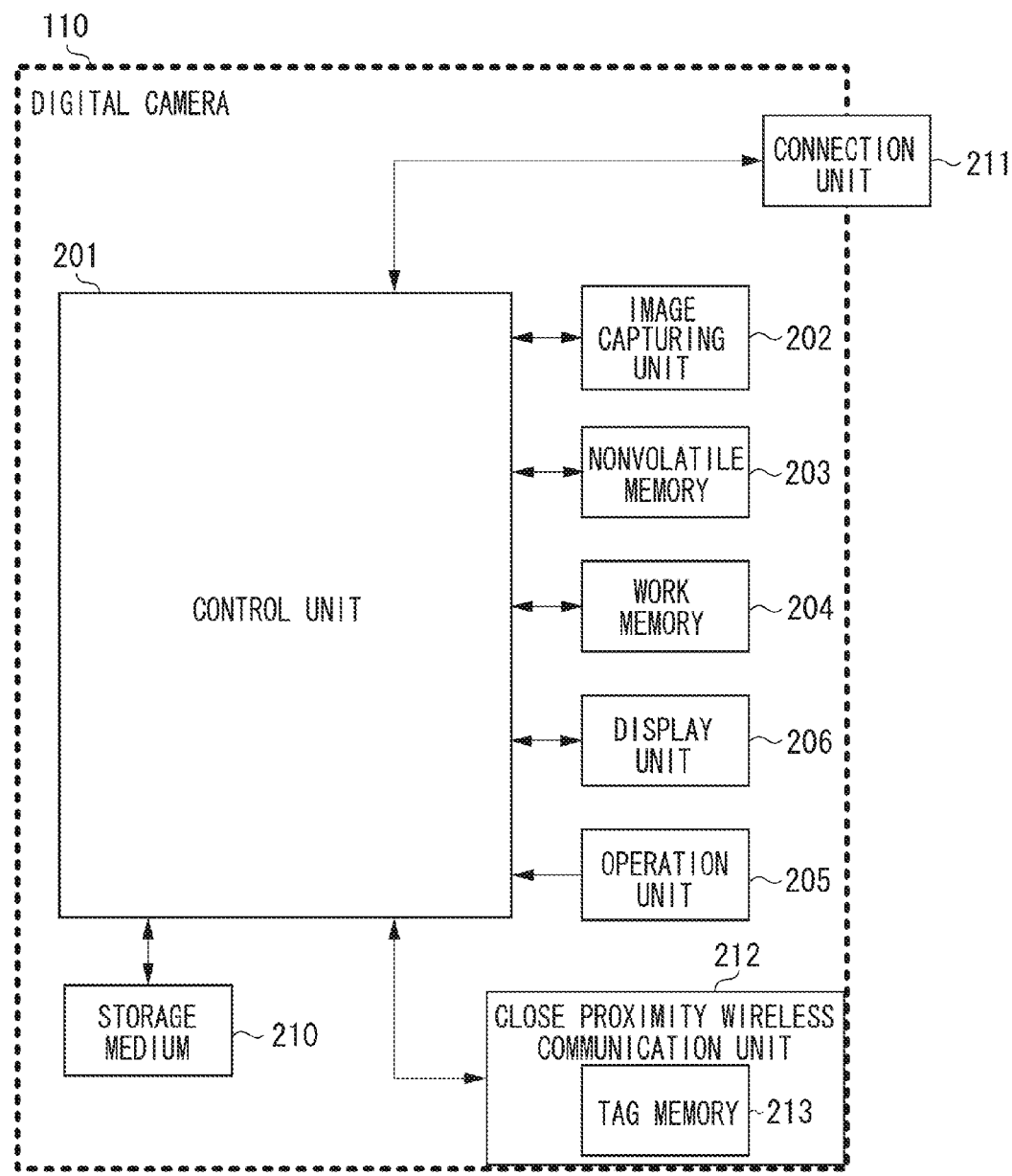
FIG. 2 is a block diagram illustrating a digital camera 110.

FIG. 2 is a diagram illustrating the digital camera 110. A control unit 201 includes a central processing unit (CPU) and the like and controls each unit of the digital camera 110 in accordance with an input signal and a program described below. A plurality of hardware units, instead of the control unit 201, may control the entire apparatus, by cooperating with each other to execute processing. An image capturing unit 202 includes an optical lens unit, an optical system including an aperture diaphragm, a zoom lens, and a focus lens, and an image sensor which converts light (image), introduced through the optical lens unit, into an electrical image signal. A complementary metal oxide semiconductor (CMOS) sensor or a charge coupled device (CCD) sensor is generally used as the image sensor. The image capturing unit 202 converts object light, focused by a lens in the image capturing unit 202, into an electrical signal with the image sensor, under the control by the control unit 201. Then, the image capturing unit 202 executes noise reduction processing and the like and outputs the resultant digital data as image data. The image data thus generated by the digital camera 110 according to the present exemplary embodiment is stored in a storage medium 210 in accordance with the standard of Design rule for Camera File system (DCF).

A nonvolatile memory 203 is a memory capable of electrically storing and erasing data, and stores a program described below that is executed by the control unit 201. A work memory 204 is used as a buffer memory that temporarily holds the image data generated by the image capturing unit 202, an image display memory for a display unit 206, a work area for the control unit 201. Functions and processes performed by the digital camera 110 described later are implemented by the control unit 201 reading out the program stored in the nonvolatile memory 203 and the like, and executing the program.

An operation unit 205 is used for receiving an instruction to the digital camera 110 from the user. The operation unit 205 includes a power button for issuing an instruction to turn ON or OFF the digital camera 110, a release switch for issuing an instruction to capture an image, a moving image capturing switch for issuing an instruction to capture a moving image, and a reproduction button for issuing an instruction to reproduce the image data. The operation unit 205 further includes an operation member such as a dedicated connection button for starting communication with an external apparatus through a connection unit 211 describe below. The operation unit 205 further includes a touch panel formed in the display unit 206 described later. The release switch includes SW1 and SW2. The SW1 is turned ON when the release switch enters what is known as a half-pressed state, in which an instruction for image capturing preparation such as auto-focus (AF) processing, auto-exposure (AE) processing, auto-white balance (AWB) processing, and pre-flash (EF) processing is received. The SW2 is turned ON when the release switch enters what is known as a full-pressed state, in which an instruction to perform image capturing is received.

The display unit 206 displays a view finder image for image capturing, the captured image data, characters used for an interactive operation, and the like. The digital camera 110 may not necessarily include the display unit 206, as long as the digital camera 110 can be connected to the display unit 206 within or outside the digital camera 110 and at least has a display control function for controlling the display on the display unit 206. The storage medium 210 can store the image data output from the image capturing unit 202. The storage medium 210 may be detachably attached to the digital camera 110, or may be incorporated in the digital camera 110. Thus, the digital camera 110 may at least include a unit for accessing the storage medium 210.

The connection unit 211 is an interface for establishing connection to an external apparatus. The digital camera 110 according to the present exemplary embodiment can exchange data with the external apparatus through the connection unit 211. For example, the image data generated by the image capturing unit 202 can be transmitted to the external apparatus through the connection unit 211, under the control by the control unit 101. In the present exemplary embodiment, the connection unit 211 includes an interface for performing wireless LAN communication conforming to IEEE802.11 standard with the external apparatus. The control unit 201 establishes the wireless communication with the external apparatus by controlling the connection unit 211. The communication method is not limited to the wireless LAN, and includes an infrared communication method as well as communication based on Bluetooth® and a wireless universal serial bus (USB). Picture Transfer Protocol over Internet Protocol (PTP/IP) for example, may be used as a protocol for exchanging data using the communication method.

A close proximity wireless communication unit 212 includes an antenna for the wireless communication and a modulation-demodulation circuit for processing a wireless signal, and a communication controller, for example. The close proximity wireless communication unit 212 outputs a modulated wireless signal through the antenna, and modulates the wireless signal received through the antenna. Thus, contactless close proximity communication conforming to an ISO/IEC 18092 standard (what is known as NFC) is implemented. The close proximity wireless communication unit 212 according to the present exemplary embodiment is disposed on a side portion of the digital camera 110.

The digital camera 110 and the mobile phone 120 described below start the communication and are connected to each other when the close proximity wireless communication units thereof are brought close to each other. More specifically, the close proximity wireless communication units, used to establish the connection, do not necessarily have to be in contact with each other. The close proximity wireless communication units can communicate with each other while being apart from each other by a predetermined distance. Thus, the apparatuses can be connected to each other only by being brought within a range in which the close proximity wireless communication is available. In the description below, the operation of putting the apparatuses within the range in which the close proximity wireless communication is available is also described as bringing the apparatuses close to each other.

When the close proximity wireless communication units of the apparatuses are within a range in which the close proximity wireless communication is unavailable, the communication does not start. When the close proximity wireless communication units of the apparatuses are within the range in which the close proximity wireless communication is available and the apparatuses are connected to each other, if the close proximity wireless communication units of the apparatuses are separated from each other to be in the range in which the wireless communication apparatuses are unavailable, the communication connection is released. The contactless close proximity communication implemented by the close proximity wireless communication unit 212 is not limited to the NFC, and other wireless communication may be employed. For example, contactless close proximity communication conforming to an ISO/IEC 14443 standard may be employed as the contactless close proximity communication implemented by the close proximity wireless communication unit 212.

The control unit 201 can perform writing and reading to and from the tag memory 213. Furthermore, an external apparatus, having a reader/writer function corresponding to the NFC, can perform the writing and reading to and from the tag memory 213 through the close proximity wireless communication. When the digital camera 110 communicates with the external apparatus through the close proximity wireless communication, the control is performed through power generated by electromagnetic induction for receiving radio waves supplied from the external apparatus. Thus, the digital camera 110 in the power OFF state can perform writing and reading to and from the external apparatus, without requiring the control performed by the control unit 101.

In the present exemplary embodiment, the communication speed of the communication implemented by the connection unit 211 is faster than that of the communication implemented by the close proximity wireless communication unit 212. A communicable range for the communication implemented by the connection unit 211 is larger than that for the communication implemented by the close proximity wireless communication unit 212. However, the communication implemented by the close proximity wireless communication unit 212 can restrict communication partners because of its small communicable range, and thus requires no processing of exchanging an encryption key required for the communication implemented by the connection unit 211, thereby achieving easier communication than the case where the connection unit 211 is used.

The connection unit 211 of the digital camera 110 according to the present exemplary has an AP mode of operating as an access point in an infrastructure mode and a CL mode of operating as a client in the infrastructure mode. When the connection unit 211 operates in the CL mode, the digital camera 110 according to the present exemplary embodiment can operate as a CL apparatus in the infrastructure mode, and thus can join a network formed by a peripheral AP apparatus by connecting to the AP apparatus.

When the connection unit 211 operates in the AP mode, the digital camera 110 according to the present exemplary embodiment can operate as a simple AP as one type of the AP with relatively limited functions. The digital camera 110, operating as the simple AP, forms a network by emitting a beacon including a communication parameter. An apparatus in the periphery of the digital camera 110 can recognize that the digital camera 110 is an AP apparatus by receiving the beacon, and can join the network formed by the digital camera 110. A program for operating the digital camera 110 as described above is assumed to be held in the nonvolatile memory 203. The digital camera 110 according to the present exemplary embodiment is one type of the AP, but is the simple AP having no gateway function of transferring data, received from the CL apparatus, to an Internet provider and the like. Thus, the digital camera 110 cannot transfer the data received from another apparatus that has joined the network formed by the digital camera 110 to a network such as the Internet.

The close proximity wireless communication unit 212 of the digital camera 110 and a close proximity wireless communication unit 309 of the mobile phone 120 described below communicate with each other, thereby sharing a communication parameter for establishing the communication between the connection unit 211 of the digital camera 110 and a connection unit 308 of the mobile phone 120.

Thus, the communication parameter is stored in the tag memory 213 in advance. The communication parameter herein includes information for joining the network such as a service set identifier (SSID) and a password. An IP address of the digital camera 110 may be stored for example. In this case, discovery processing after the mobile phone 120 has joined the network can be omitted and thus the communication can be more smoothly established.

<Configuration of Mobile Phone>

Figure 3:
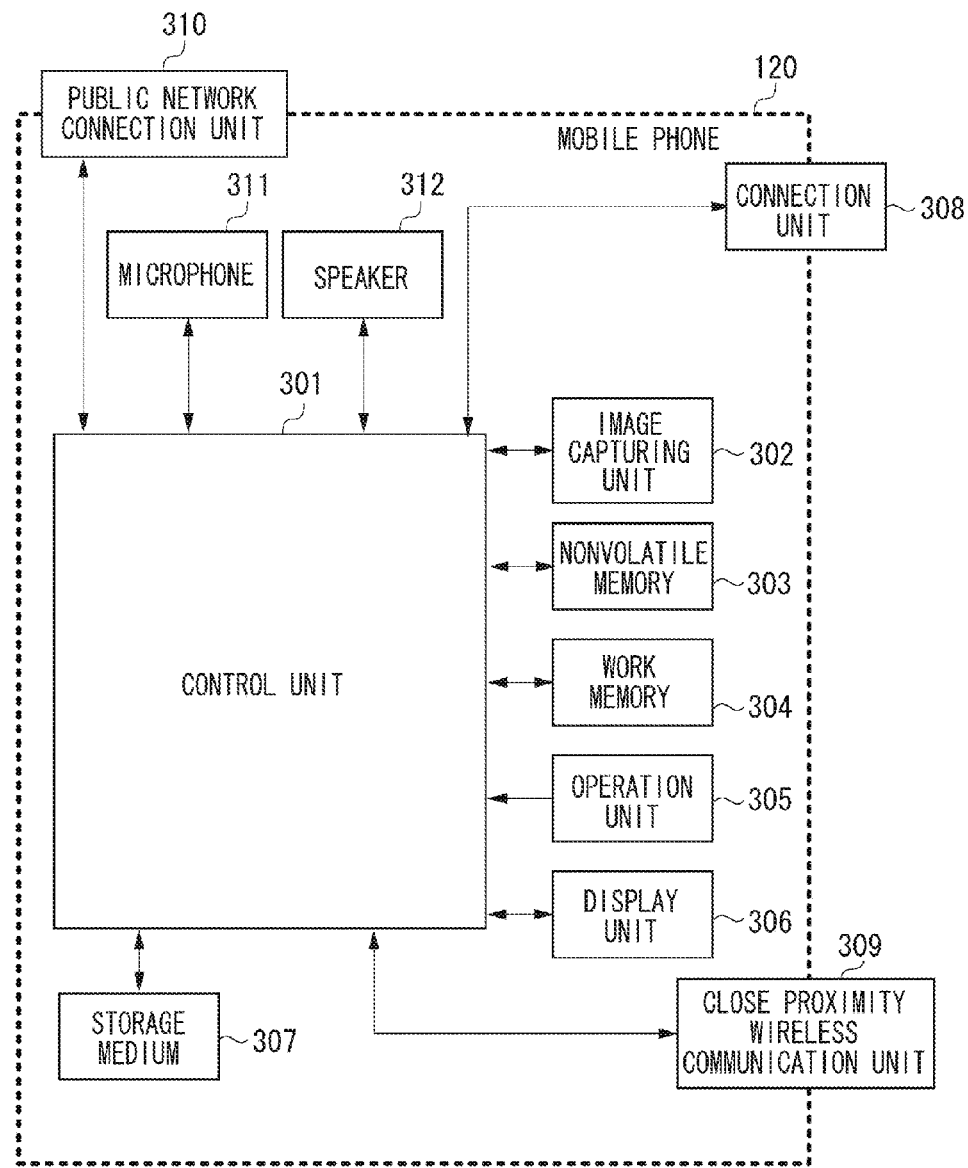
FIG. 3 is a block diagram illustrating a mobile phone 120.

FIG. 3 is a diagram illustrating the mobile phone 120. A control unit 301 includes a CPU and controls each unit of the mobile phone 120 in accordance with an input signal or a program described below. A plurality of hardware units, instead of the control unit 301, may control the entire apparatus, by cooperating with each other to execute processing s. The image capturing unit 302 converts object light, focused by a lens in the image capturing unit 302, into an electrical signal. Then, the image capturing unit 302 executes noise reduction processing and the like, and outputs the resultant digital data as image data. The generated image data is stored in a buffer memory, and then is subjected to a predetermined operation performed by the control unit 301. The resultant data is stored in the storage medium 307.

A nonvolatile memory 303 is a memory capable of electrically storing and erasing data. The nonvolatile memory 303 stores an operating system (OS) as basic software executed by the control unit 301, and an application that works together with the OS to implement a practical function. In the present exemplary embodiment, the nonvolatile memory 303 stores an application for communicating with the digital camera 110. A work memory 304 is used as an image display memory for a display unit 306, a work area for the control unit 301, or the like. Functions and processes of the mobile phone 120 described below are implemented by the control unit 301 reading out the program stored in the nonvolatile memory 303 and executing the program.

An operation unit 305 is used for receiving an instruction to the mobile phone 120 from the user. The operation unit 305 includes operation members such as a power button for issuing an instruction to turn ON or OFF the mobile phone 120, and a touch panel formed in a display unit 306. The display unit 306 displays image data, characters used for an interactive operation, or the like. The mobile phone 120 may not necessarily include the display unit 306, as long as the mobile phone 120 can be connected to the display unit 306 and at least has a display control function for controlling the display on the display unit 306. A storage medium 307 can store the image data output from the image capturing unit 302. The storage medium 307 may be detachably attached to the mobile phone 120, or may be incorporated in the mobile phone 120. Thus, the mobile phone 120 may at least include a unit for accessing the storage medium 307.

The connection unit 308 is an interface for establishing connection to an external apparatus. The mobile phone 120 according to the present exemplary embodiment can exchange e data with the digital camera 110 through the connection unit 308. In the present exemplary embodiment, the control unit 301 can connect to the digital camera 110 through the connection unit 308 as an antenna. The control unit 301 may connect to the digital camera 110 directly or through the access point. The PTP/IP through the wireless LAN may be used as a protocol for transmitting data. However, the communication with the digital camera 110 are not limited to the one described above. For example, the connection unit 308 may include a wireless communication module such as an infrared communication module, a Bluetooth® communication module, and a wireless USB. Alternatively, wired connection based on a USB cable, high-definition multimedia interface (HDMI)®, IEEE1394, or the like may be used.

The close proximity wireless communication unit 309 is a communication unit that implements contactless close proximity wireless communication with another apparatus. The close proximity wireless communication unit 309 includes an antenna for the wireless communication, a modulation-demodulation circuit for processing a wireless signal, and a communication controller. The close proximity wireless communication unit 309 outputs a modulated wireless signal through the antenna, and modulates the wireless signal received through the antenna, whereby the contactless close proximity wireless communication can be established. Thus, the contactless close proximity communication conforming to the ISO/IEC 18092 standard (what is known as NFC) is implemented. Upon receiving a data readout request from another device, the close proximity wireless communication unit 309 outputs response data based on the data stored in the nonvolatile memory 303. In the present exemplary embodiment, the mobile phone 120 operates as a card reader mode, a card writer mode, and a P2P mode defined in the NFC standard, and mainly serves as an Initiator, through the close proximity wireless communication unit 309. Meanwhile, the digital camera 110 mainly serves as a Target, through the close proximity wireless communication unit 212. The present exemplary embodiment is described using an example where an NFC data exchange format (NDEF) is employed as a data format in the communication using the NFC.

A public network connection unit 310 is an interface used for performing public wireless communication. With the mobile phone 120, a phone call can be made to another apparatus through the public network connection unit 310. Here, the control unit 301 can performs the phone call by inputting and outputting an audio signal through a microphone 311 and a speaker 312. In the present exemplary embodiment, the control unit 301 can connect to a public network through the public network connection unit 310 as an antenna. A single antenna can serve as both the connection unit 308 and the public network connection unit 310.

<Tag Memory Management Processing>

Figure 4:
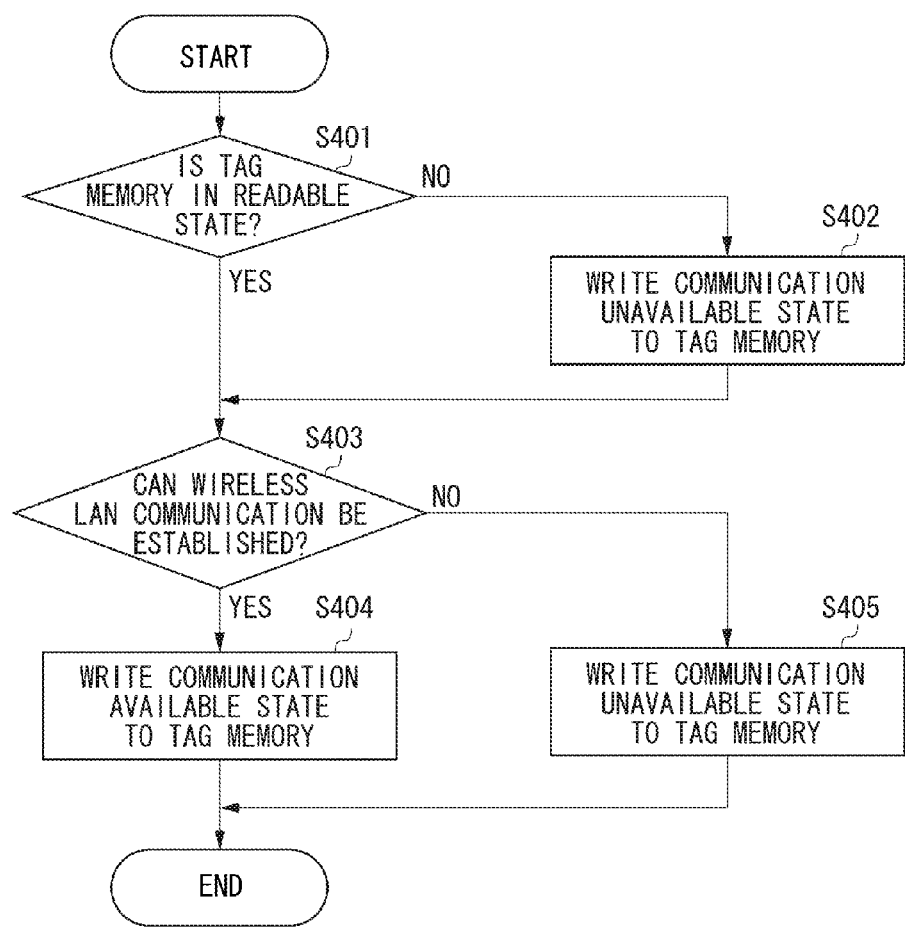
FIG. 4 is a flowchart illustrating tag memory management processing.

FIG. 4 is a flowchart illustrating tag memory management processing as communication management processing executed by the digital camera 110. The tag memory management processing is executed by the digital camera 110 in a power-ON state, that is, when the digital camera 110 is activated. When the digital camera 110 is activated, the control unit 201 of the digital camera 110 checks information stored in the tag memory 213 in step S401. The control unit 201 determines whether the tag memory 213 is in a readable state in which information for starting the wireless LAN connection can be read out by the mobile phone 120. For example, the control unit 201 determines that the tag memory 213 is not in the readable state, i.e., in an unreadable state, when a data format of data stored in the tag memory 213 is different from the data format stored in the digital camera 110 in advance. The control unit 201 determines that the tag memory 213 is in the unreadable state when a parameter of the tag memory 213 includes a value other than a value that can be set in the digital camera 110 in advance. On the other hand, the control unit 201 determines that the tag memory 213 is in the readable state when information indicating a correct parameter value in a correct data format (format conforming to the NDEF in the present exemplary embodiment). When the control unit 201 determines that the tag memory 213 is in the readable state (Yes in step S401), the processing proceeds to step S403. On the other hand, when the control unit 201 determines that the tag memory 213 is in the unreadable state (No in step S401), the processing proceeds to step S402.

In step S402, the control unit 201 writes to the tag memory 213, a communication unavailable state as the communication state for the wireless LAN connection (write processing). The communication unavailable state is information indicating that the communication for the wireless LAN connection cannot be performed. When the communication unavailable state is thus written to the tag memory 213, the mobile phone 120 can recognize that the handover to the wireless LAN communications cannot be implemented, by reading out the information in the tag memory 213. Thus, the mobile phone 120, when recognizing that the handover to the wireless LAN communication cannot be implemented, does not execute the processing for starting to establish the wireless LAN connection in vain. When a third party with a malicious intension writes inappropriate information to the tag memory 213, the inappropriate information in the tag memory 213 is rewritten with the information indicating the communication unavailable state in step S402. Thus, the mobile phone 120 executing processing in step S403 described below can be prevented from reading out the inappropriate information.

In step S403, the control unit 201 determines whether the wireless LAN connection can be established by a function of the digital camera 110. The control unit 201 executes the processing in step S403 when the writing of the communication unavailable state to the tag memory 213 in step S402 is completed. More specifically, the control unit 201 refers to a condition table illustrating conditions with which the wireless LAN connection is available or unavailable, to determine whether the wireless LAN connection can be established. FIG. 5 illustrates an example of the condition table. A condition table 500 illustrated in FIG. 5 stores, for each function of the digital camera 110, a condition for a wireless LAN connection unavailable state and a condition for a wireless LAN connection available state. The condition table 500 illustrated in FIG. 5 illustrates the following six conditions.

Condition 1: Power State

When the power of the digital camera 110 is OFF, the wireless LAN connection cannot be established. Thus, a state in which the power is OFF is set as a condition for the wireless LAN connection unavailable state, and a state in which the power is ON is set as a condition for the wireless LAN connection available state.

Condition 2: Wireless LAN Function Setting

When the wireless LAN function of the digital camera 110 is invalidated, the wireless LAN connection cannot be established. Thus, a state in which the wireless LAN function is set to be invalid by a user operation is set as a condition for the wireless LAN connection unavailable state, and a state in which the wireless LAN function is set to be valid by a user operation is set as a condition for the wireless LAN connection available state.

Condition 3: Wireless LAN Communication

When the digital camera 110 is performing the wireless LAN communication with the other apparatus, the connection to the communication partner apparatus has priority and thus no new wireless LAN connection is established. Thus, a state of performing the wireless LAN communication with the other apparatus through the connection unit 211 is set as a condition for the wireless LAN connection unavailable state, and a state of not performing the wireless LAN communication with the other apparatus through the connection unit 211 is set as a condition for the wireless LAN connection available state.

Condition 4: Memory Card

When a removable memory card, as the storage medium 210 of the digital camera 110, is not inserted in the digital camera 110, the image cannot be viewed or captured by performing the wireless LAN communication. Thus, a state in which the memory card is not inserted is set as a condition for the wireless LAN connection unavailable state, and a state in which the memory card is inserted is set as a condition for the wireless LAN connection available state.

Condition 5: Still Image Capturing State

When the capturing of a still image is in process, the digital camera 110 does not establish the wireless LAN connection, due to the processing load. Thus, a state in which the capturing of a still image is in process (the release switch of the operation unit 205 operated by the user is in the half-pressed state) is set as a condition for the wireless LAN connection unavailable state, and a state in which the capturing of a still image is not in process is set as a condition for the wireless LAN connection available state.

Condition 6: Moving Image Capturing State

When the capturing of a moving image is in process, the digital camera 110 does not establish the wireless LAN connection, due to the processing load. Thus, a state in which the capturing of a moving image is in process (the operation unit 205 is operated by the user, and a switch for the moving image capturing is in the power-ON state) is set as a condition for the wireless LAN connection unavailable state, and a state in which the capturing of a moving image is not in process is set as a condition for the wireless LAN connection available state.

Referring back to FIG. 4, the control unit 201 determines in step S403 that the wireless LAN connection can be established when all the six conditions for the wireless LAN connection available state defined in the condition table 500 are met. When the control unit 201 determines that the digital camera 110 is in the wireless LAN connection available state (Yes in S403), the processing proceeds to step S404. On the other hand, when the control unit 201 determines that the digital camera 110 is in the wireless LAN connection unavailable state (No in S403), the processing proceeds to step S405. In step S404, the control unit 201 writes the communication available state, as the communication state for the wireless LAN connection, to the tag memory 213. In step S405, the control unit 201 writes the communication unavailable state, as the communication state for the wireless LAN connection, to the tag memory 213. When the communication unavailable state has already been written to the tag memory 213 at this point, the control unit 201 does not execute the processing of writing the communication unavailable state, and the tag memory management processing is terminated. The processing of each of steps S401 and S403 is an example of determination processing of determining whether the communication through the wireless LAN connection as a first communication method is available, when the digital camera 110 as a wireless communication apparatus is activated.

When writing the communication state to the tag memory 213 in steps S402, S404, and S405, the control unit 201 also stores the communication state, written to the tag memory 213, also in the work memory 204. When the information in the tag memory 213 is rewritten by the external apparatus while the digital camera 110 is in the power-ON state, the control unit 201 can further rewrite the information in the tag memory 213 with the information stored in the work memory 204. When the digital camera 110 is turned OFF, the information stored in the work memory 204 is erased.

<Tag Memory Restoration Processing>

Figure 6:
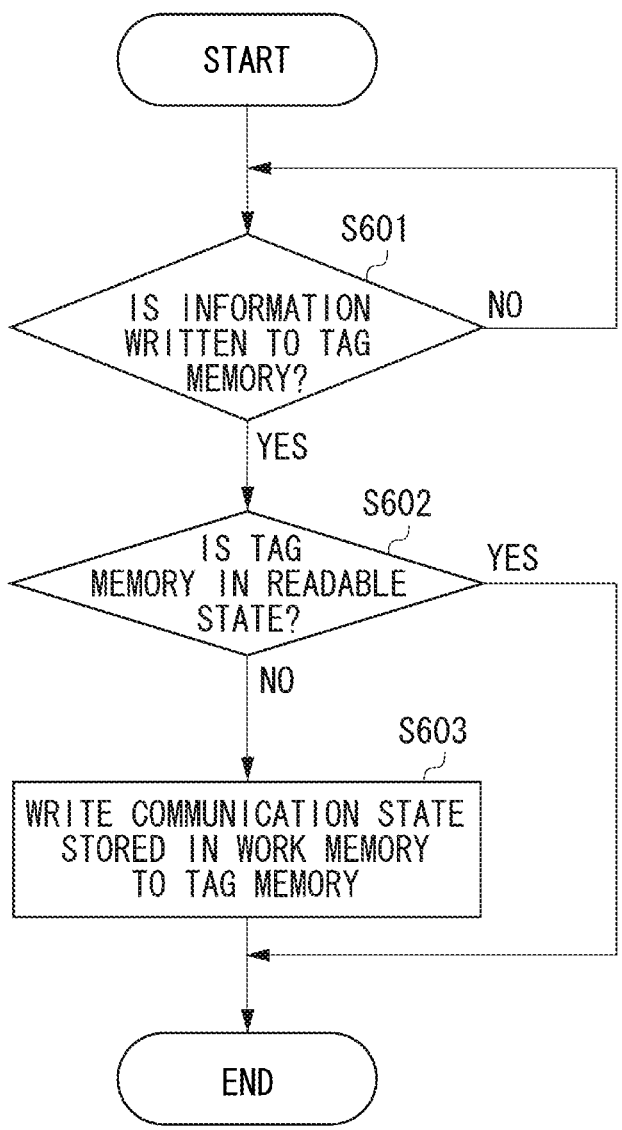
FIG. 6 is a flowchart illustrating tag memory restoration processing.

FIG. 6 is a flowchart illustrating tag memory restoration processing executed by the digital camera 110 in the power ON state. When inappropriate information is written to the tag memory 213, in the tag memory restoration processing, the digital camera 110 restores information that is supposed to be stored in the tag memory 213. In step S601, the control unit 201 checks whether the information is written to the tag memory 213 when the digital camera 110 performs the close proximity wireless communication with a communication partner apparatus. When the information is written to the tag memory 213 (Yes in step S601), the processing proceeds to step S602. In step S602, the control unit 201 checks the information stored in the tag memory 213, and determines whether the tag memory 213 is in a readable state. The processing executed in step S602 is the same as the processing in step S401 described with reference to FIG. 4.

When the control unit 201 determines that the tag memory 213 is in the unreadable state (No in step S602), the processing proceeds to step S603. On the other hand, when the control unit 201 determines that the tag memory 213 is in the readable state (Yes in step S602), the tag memory restoration processing is terminated. In step S603, the control unit 201 writes the communication state, stored in the work memory 204, to the tag memory 213, and the tag memory restoration processing is terminated.

The user of the mobile phone 120 might generate an unofficial application, and write information indicating a correct parameter value in a correct data format to the tag memory 213 of the digital camera 110 from the mobile phone 120. In this case, the digital camera 110 determines that the tag memory 213 is in the readable state, and a connection in a network level is allowed to be established. Because, a wireless LAN connection sequence in a network level is supported by the OS of the mobile phone 120 in many cases. Even when the data is written to or read out from the close proximity wireless tag memory 213 through the close proximity communication by using the unofficial application, the unofficial application does not necessarily correspond to the wireless LAN communication in an application level after the handover. When the writing to the tag memory 213 is performed by using the unofficial application, the digital camera 110 attempts to establish the wireless LAN connection with the mobile phone 120. However, due to the protocol mismatch in the application level, the digital camera 110 cannot receive required information from the mobile phone 120, and thus it is determined that wireless LAN connection error has occurred. For example, when the required information cannot be received with PTP/IP through the wireless LAN communication, it is determined that the PTP/IP connection error has occurred. When the connection fails in the application level as a result of the handover as described above, the digital camera 110 according to the present exemplary embodiment checks the internal state, and writes the communication state for the wireless LAN connection to the tag memory 213.

As described above, in the communication system according to the first exemplary embodiment, the digital camera 110 determines whether the wireless LAN connection can be established upon being activated, and can write the communication unavailable state to the tag memory 213 when the communication is unavailable. The digital camera 110 can rewrite the appropriate information to the tag memory when inappropriate information is written to or appropriate information that has been stored is erased from the tag memory 213. Thus, the digital camera 110 can appropriately manage the tag memory 213.

Figure 7:
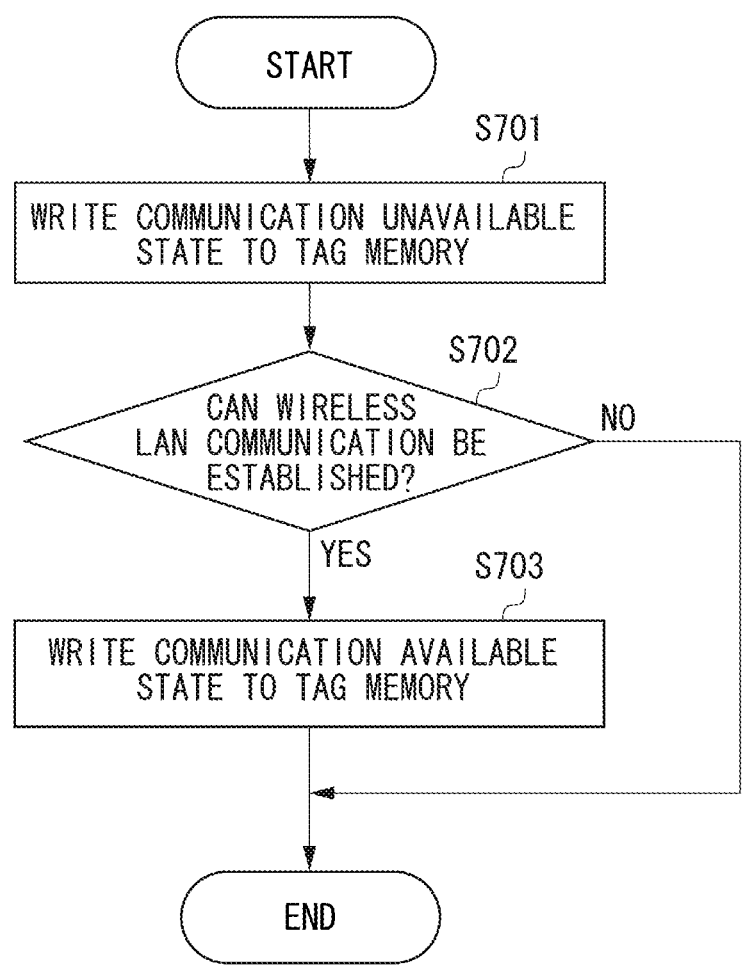
FIG. 7 is a flowchart illustrating tag memory management processing according to a second exemplary embodiment.

In a communication system 100 according to a second exemplary embodiment, the digital camera 110 writes communication unavailable information to the tag memory 213 before determining whether the wireless LAN connection can be established upon being activated. Described below is a point where the communication system 100 according to the second exemplary embodiment is different from the communication system 100 according to the first exemplary embodiment. FIG. 7 is a flowchart illustrating tag memory management processing executed by the digital camera 110 according to the second exemplary embodiment. The tag memory management processing according to the second exemplary embodiment is executed when the digital camera 110 is powered ON, i.e., when the digital camera 110 is activated, as in the case of the tag memory management processing according to the first exemplary embodiment.

When the digital camera 110 is activated, in step S701, the control unit 201 of the digital camera 110 writes the communication unavailable state, as the communication state for the wireless LAN connection, to the tag memory 213 (writing processing). Then, in step S702, the control unit 201 determines whether the wireless LAN connection can be established by the function of the digital camera 110 (determination processing). The processing in step S702 is the same as the processing in step S403 described with reference to FIG. 4. When the control unit 201 determines that the digital camera 110 is in the state where the wireless LAN connection can be established (Yes in step S702), the processing proceeds to step S703. On the other hand, when the control unit 201 determines that the digital camera 110 is in the state where the wireless LAN connection cannot be established (No in step S702), the tag memory management processing is terminated. In step S703, the control unit 201 writes the communication available state, as the communication state for the wireless LAN connection, to the tag memory 213, and then the tag memory management processing is terminated.

As described above, the communication unavailable state is written to the tag memory 213 before the state check immediately after the digital camera 110 is activated. This is because the communication state for the wireless LAN connection the has been written to the tag memory 213 might not match a result of determining whether the connection for the wireless LAN connection can be established by the function of the digital camera 110. For example, when the wireless LAN connection can be established by the function of the digital camera 110, the communication available state is written, as the communication state for the wireless LAN connection, to the tag memory 213. When a battery is removed from the digital camera 110 in this state, the communication state for the wireless LAN connection is supposed to be switched to the communication unavailable state, in accordance with the condition related to the power supply state defined as "condition 1" in the condition table 500. However, due to the absence of the battery, the control unit 201 cannot rewrite the information in the tag memory 213. Thus, in this state, the close proximity wireless communication is performed between the digital camera 110 and the mobile phone 120, so that the mobile phone 120 attempts to start establishing the wireless LAN connection.

To solve this problem, the digital camera 110 performs the state check (i.e., performs condition determination based on the table illustrated in FIG. 5) regardless of the information in the tag memory 213 upon being activated, and writes information indicating whether the communication through the wireless LAN connection can be performed in accordance with the determined state. However, the state check requires a certain period of time, and thus the close proximity wireless communication might be performed between the digital camera 110 and the mobile phone 120, and the mobile phone 120 attempts to start establishing the wireless LAN connection while the state check is in process. Thus, the digital camera 110 according to the present exemplary embodiment first writes the communication unavailable state, as the communication state for the wireless LAN connection, to the tag memory 213, and then determines whether the wireless LAN connection can be established. As a result, the digital camera 110 in the wireless LAN connection unavailable state can be prevented from starting to establish the wireless LAN connection with the digital camera 110.

The exemplary embodiments are described above using an example where the mobile phone 120 is prevented from starting to establish the wireless LAN connection with the digital camera 110 by writing the communication unavailable state to the tag memory 213. Alternatively, for example, the close proximity wireless communication unit 212 may not respond to a request for performing close proximity wireless communication received from the mobile phone 120. More specifically, a setting of responding or not responding to the request is stored in an internal memory of the close proximity wireless communication unit 212, and the close proximity wireless communication unit 212 refers to the setting and determines whether to respond to the request from the mobile phone 120. Then, the control unit 101 rewrites the setting before the state check, and thus performs control to determine whether the close proximity wireless communication unit 212 responds to the request.

Aspects of the present invention are also implemented by executing the following processing. More specifically, software (program) for implementing the functions in the exemplary embodiments described above is provided to a system or an apparatus through a network or various storage media. Then, a computer (or a CPU, a microprocessor unit (MPU), or the like) reads out and executes the program.

In the above-described exemplary embodiments, the tag memory can be appropriately managed.

The exemplary embodiments are described above in detail, but aspects of the present invention are not limited to the particular exemplary embodiments, and various modifications and changes can be made within a scope of the spirit of aspects of the present invention described in claims.

Additional embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-190088, filed Sep. 18, 2014, which is hereby incorporated by reference herein in its entirety.

What is claimed is:

1. A wireless communication apparatus comprising:
   a first communication unit configured to perform communication with an external apparatus through a first wireless communication method;
   a second communication unit configured to perform communication with the external apparatus through a second wireless communication method different from the first wireless communication method; and
   a control unit configured to control communication processing of establishing the communication with the external apparatus through the second communication unit by using a communication parameter shared with the external apparatus through the first communication unit,
   wherein the control unit determines, in response to activation of the wireless communication apparatus, whether the wireless communication apparatus is in a predetermined state,
   wherein when it is determined that the wireless communication apparatus is in the predetermined state, the control unit sets the wireless communication apparatus to be in a state of executing the communication processing,
   wherein when it is determined that the wireless communication apparatus is not in the predetermined state, the control unit sets the wireless communication apparatus to be in a state of not executing the communication processing,
   wherein the control unit sets, before the determination is made, the wireless communication apparatus to be in the state of not executing the communication processing in response to activation of the wireless communication apparatus,
   wherein the first communication unit includes a storage area accessible by both the control unit and the external apparatus, and
   wherein the state of not executing the communication processing is a state in which information, indicating that the communication through the second communication unit is unavailable, is stored in a storage area of the first communication unit.

2. The wireless communication apparatus according to claim 1, wherein the predetermined state includes a state in which communication through the second communication unit is available.

3. The wireless communication apparatus according to claim 1, wherein the predetermined state includes at least one of a state where a remaining battery capacity is greater than or equal to a predetermined amount, a state where a detachably attachable storage medium is attached, a state where image capturing is in process, or a state where a wireless function setting has been turned ON.

4. The wireless communication apparatus according to claim 1,
   wherein the first communication unit responds to communication from the external apparatus without requiring control by the control unit, and
   wherein the state of not executing the communication processing is a state in which the first communication unit does not respond to the communication from the external apparatus.

5. The wireless communication apparatus according to claim 1, wherein the second communication unit forms a network based on the second wireless communication method by emitting a beacon including the communication parameter shared with the external apparatus through the first communication unit.

6. The wireless communication apparatus according to claim 1, further comprising an image capturing unit configured to capture an image of an object and output image data,
   wherein the control unit performs control to transmit the image data to the external apparatus through the second communication unit.

7. A wireless communication apparatus comprising:
   a first communication unit configured to perform communication with an external apparatus through a first wireless communication method, the first communication unit including a storage area readable by the external apparatus;
   a second communication unit configured to perform communication with the external apparatus through a second wireless communication method different from the first wireless communication method; and
   a control unit configured to determine, in response to activation of the wireless communication apparatus, whether the communication through the second wireless communication method is available, and perform control to write information indicating whether the communication through the second wireless communication method is available to the storage area, in accordance with a result of the determination,
   wherein the control unit performs control to write information indicating that the communication through the second wireless communication method is unavailable to the storage area before the determination is made,
   wherein, when the external apparatus performs writing to the storage area while the wireless communication apparatus is in a running state, the control unit rewrites information stored in the storage area.

8. The wireless communication apparatus according to claim 7, wherein the storage area stores a communication parameter for performing the communication through the second wireless communication method.

9. The wireless communication apparatus according to claim 8, wherein the communication parameter for performing the communication through the second wireless communication method includes information for joining a network based on the second wireless communication method.

10. The wireless communication apparatus according to claim 7, wherein the second communication unit forms a network based on the second wireless communication method using a communication parameter shared with the external apparatus through the first communication unit.

11. The wireless communication apparatus according to claim 7, further comprising an image capturing unit configured to capture an image of an object and output image data,
wherein the control unit performs control to transmit the image data to the external apparatus through the second communication unit.

12. The wireless communication apparatus according to claim 7, wherein the control unit determines that the communication through the second wireless communication method is unavailable when the wireless communication apparatus is in at least one of a state where a remaining battery capacity is greater than or equal to a predetermined amount, a state where a detachably attachable storage medium is attached, a state where image capturing is in process, or a state where a wireless function setting has been turned ON.

13. The wireless communication apparatus according to claim 7,
wherein the first communication unit performs communication in accordance with an NFC standard, and
wherein the second communication unit performs communication in accordance with a wireless LAN standard.

14. A wireless communication apparatus comprising:
a close proximity wireless communication unit configured to establish connection with an external apparatus through close proximity wireless communication; and
a control unit configured to determine, in response to activation of the wireless communication apparatus, whether the wireless communication apparatus is in a predetermined state, and performs control to enable or disable the close proximity wireless communication unit in accordance with a result of the determination,
wherein the determination is made after disabling the close proximity wireless communication when the wireless communication apparatus is active,
wherein the predetermined state includes at least one of a state where a remaining battery capacity is greater than or equal to a predetermined amount, a state where a detachably attachable storage medium is attached, a state where image capturing is in process, or a state where a wireless function setting has been turned ON.

15. A controlling method for a wireless communication apparatus including a first wireless communication unit, a second wireless communication unit, and a control unit, the controlling method comprising:
communicating with an external apparatus through a first wireless communication method;
communicating with the external apparatus through a second wireless communication method different from the first wireless communication method;
controlling communication processing of establishing communication with the external apparatus through the second communication method by using a communication parameter shared with the external apparatus through the first communication method;
determining, in response to activation of the wireless communication apparatus, whether the wireless communication apparatus is in a predetermined state;
setting, when it is determined that the wireless communication apparatus is in the predetermined state, the wireless communication apparatus to be in a state of executing the communication processing;
setting, when it is determined the wireless communication apparatus is not in the predetermined state, the wireless communication apparatus to be in a state of not executing the communication processing; and
accessing, by either the control unit or the external apparatus, a storage area in the first communication unit,
wherein the wireless communication apparatus is set to be in the state of not executing the communication processing after the wireless communication apparatus is activated and before the determination is made, and
wherein the state of not executing the communication processing is a state in which information, indicating that the communication through the second communication unit is unavailable, is stored in a storage area of the first communication unit.

16. A non-transitory computer-readable storage medium that stores computer executable instructions for causing a computer to execute a controlling method for a wireless communication apparatus including a first wireless communication unit, a second wireless communication unit, and a control unit, the controlling method comprising:
communicating with an external apparatus through a first wireless communication method;
communicating with the external apparatus through a second wireless communication method different from the first wireless communication method;
controlling communication processing of establishing communication with the external apparatus through the second communication method by using a communication parameter shared with the external apparatus through the first communication method;
determining, in response to activation of the wireless communication apparatus, whether the wireless communication apparatus is in a predetermined state;
setting, when it is determined that the wireless communication apparatus is in the predetermined state, the wireless communication apparatus to be in a state of executing the communication processing;
setting, when it is determined the wireless communication apparatus is not in the predetermined state, the wireless communication apparatus to be in a state of not executing the communication processing; and
accessing, by either the control unit or the external apparatus, a storage area in the first communication unit,
wherein the wireless communication apparatus is set to be in the state of not executing the communication processing after the wireless communication apparatus is activated and before the determination is made, and
wherein the state of not executing the communication processing is a state in which information, indicating that the communication through the second communication unit is unavailable, is stored in a storage area of the first communication unit.

* * * * *